US011646800B2

(12) United States Patent
Yamanaka et al.

(10) Patent No.: US 11,646,800 B2
(45) Date of Patent: May 9, 2023

(54) OPTICAL TRANSMITTER AND METHOD FOR CONTROLLER OPTICAL TRANSMITTER

(71) Applicant: Nippon Telegraph and Telephone Corporation, Tokyo (JP)

(72) Inventors: Shogo Yamanaka, Musashino (JP); Yusuke Nasu, Musashino (JP); Hiroto Kawakami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/423,820

(22) PCT Filed: Jan. 15, 2020

(86) PCT No.: PCT/JP2020/001090
§ 371 (c)(1),
(2) Date: Jul. 16, 2021

(87) PCT Pub. No.: WO2020/149307
PCT Pub. Date: Jul. 23, 2020

(65) Prior Publication Data
US 2022/0116116 A1    Apr. 14, 2022

(30) Foreign Application Priority Data

Jan. 17, 2019    (JP) .............................. JP2019-006096

(51) Int. Cl.
*H04B 10/548* (2013.01)
*G02F 1/21* (2006.01)

(52) U.S. Cl.
CPC ........... *H04B 10/548* (2013.01); *G02F 1/212* (2021.01)

(58) Field of Classification Search
CPC .............................. H04B 10/548; G02F 1/212
(Continued)

(56) References Cited

U.S. PATENT DOCUMENTS 9,319,144 B2 *    4/2016    Yamanaka ....... H04B 10/50575
10,090,921 B2 *    10/2018    Yoneyama ........... H04B 10/541
(Continued)

FOREIGN PATENT DOCUMENTS

JP    2004-198461 A    7/2004
JP    5261779 B2    5/2013
(Continued)

OTHER PUBLICATIONS

Li et al; Modulation-format-free and automatic bias control for optical IQ modulators based on dither-correlation detection; Apr. 2017; Optical Society of America; p. 1-13. (Year: 2017).*
(Continued)

*Primary Examiner* — Amritbir K Sandhu
(74) *Attorney, Agent, or Firm* — Workman Nydegger (57) ABSTRACT

An optical transmitter includes quadrature modulators and light receiving elements to which inverted output light of output light from the quadrature modulators is input, the quadrature modulators including parent Mach-Zehnder modulators in respective paths of a first pair of paths into which carrier light from a light source is split, the parent Mach-Zehnder modulators including child Mach-Zehnder modulators including first phase modulation units, and second phase modulation units. When blocking a transmission optical signal, the voltage amplitude of a transmission electrical signal to be applied to the quadrature modulator is adjusted such that it is smaller than a half-wave voltage, at most two dither signals are applied to the first phase modulation units, a component output by the light receiving element, the component having n times a frequency of the
(Continued)

dither signals, is detected, and bias voltages to be applied to the first phase modulation units are controlled such that the component having n times the frequency is minimized.

6 Claims, 5 Drawing Sheets

(58) Field of Classification Search
USPC .......................................................... 398/88
See application file for complete search history.

(56) References Cited

U.S. PATENT DOCUMENTS

| | | | |
|---|---|---|---|
| 10,313,015 B2* | 6/2019 | Kawakami | H04B 10/50575 |
| 10,742,324 B1* | 8/2020 | Padmaraju | H04B 10/541 |
| 2012/0155865 A1* | 6/2012 | Kawakami | H04B 10/50572 |
| | | | 398/43 |
| 2014/0233963 A1* | 8/2014 | Le Taillandier De Gabory | |
| | | | H04B 10/541 |
| | | | 398/183 |
| 2014/0363175 A1* | 12/2014 | Yamanaka | H04B 10/50575 |
| | | | 398/183 |
| 2015/0293426 A1 | 10/2015 | Balsamo et al. | |
| 2018/0267340 A1* | 9/2018 | Rohde | G02F 1/225 |
| 2019/0310497 A1* | 10/2019 | Burke | G02F 1/3775 |
| 2021/0297159 A1* | 9/2021 | Yamanaka | H04B 10/564 |
| 2022/0116116 A1* | 4/2022 | Yamanaka | H04B 10/548 |

FOREIGN PATENT DOCUMENTS

| | | | |
|---|---|---|---|
| JP | 2014-240889 A | | 12/2014 |
| JP | 2015-532471 A | | 11/2015 |
| JP | 2016-149685 A | | 8/2016 |
| JP | 2016149685 A | * | 8/2016 |

OTHER PUBLICATIONS

Biljana et al; (Demonstration of Optical Transmission at Bit Rates of Up to 321.4 Gb/s Using Compact Silicon based Modulator and Linear Bi CMOS MZM Driver; Feb. 2017; Journal of Lightwave technology; pp. 1-7. (Year: 2017).*

* cited by examiner

OPTICAL TRANSMITTER AND METHOD FOR CONTROLLER OPTICAL TRANSMITTER

TECHNICAL FIELD

The present invention relates to an optical transmitter and a method for controlling the optical transmitter and more particularly to an optical transmitter and a method for controlling the optical transmitter in which the output light intensity of transmission light is attenuated to less than a predetermined value in a transmission light blocking state.

BACKGROUND ART

Development of optical transmitters and receivers based on a digital coherent technology which combines digital signal processing and coherent detection is in progress. An optical transmitter based on the digital coherent technology includes a light source that outputs carrier light, a quadrature modulator for modulating the carrier light, a transmission electric circuit that drives the quadrature modulator, a control circuit for operating the quadrature modulator in an appropriate bias state, and the like.

In modulating carrier light, the control circuit needs to apply bias voltages such that child and parent modulators constituting the quadrature modulator are in optimum bias conditions. It is known that the optimum bias conditions of the quadrature modulator change with time. The optimum bias conditions of the quadrature modulator also change when the temperature of the quadrature modulator changes due to changes in the ambient temperature. Thus, the control circuit detects changes in the optimum bias conditions of the quadrature modulator and performs automatic biasing control to automatically maintain the optimum bias conditions (for example, Patent Literature 1 below).

In a normal operation state (a state of modulating carrier light), the transmission electric circuit drives the quadrature modulator with a transmission electrical signal corresponding to an electrical signal input from the outside. The control circuit applies bias voltages such that the phase difference between light passing through an upper path and light passing through a lower path of each child modulator included in the quadrature modulator is 180 degrees and the phase difference between light passing through an upper path and light passing through a lower path of each parent modulator included in the quadrature modulator is 90 degrees.

It is required that the optical transmitter have, as a standard function, a function of attenuating the output light intensity of the optical transmitter to less than a predetermined value according to a control signal from an external host circuit (a transmission light blocking function). Such a transmission light blocking state can be achieved, for example, by causing the transmission electric circuit to stop the transmission electrical signal and also causing the control circuit to apply bias voltages such that the phase difference between light passing through an upper path and light passing through a lower path of each child modulator included in the quadrature modulator is 0 degrees and the phase difference between light passing through an upper path and light passing through a lower path of each parent modulator included in the quadrature modulator is 180 degrees to cancel out the light passing through the upper path and the light passing through the lower path of the parent modulator, as described in Patent Literature 2 below.

CITATION LIST

Patent Literature

[Patent Literature 1] JP 5261779 B
[Patent Literature 2] JP 2016-149685 A

SUMMARY OF THE INVENTION

Technical Problem

It is also required that the state of the optical transmitter transition from the transmission light blocking state to the normal operation state in a short time. However, when bias voltages applied to the child and parent modulators in the transmission light blocking state differ from bias voltages applied to the child and parent modulators in the normal operation state as in Patent Literature 2, there is a problem that the state cannot transition from the transmission light blocking state to the normal operation state in a short time. In particular, if the temperature of the quadrature modulator changes in the transmission light blocking state, the optimum bias conditions for the quadrature modulator change significantly. Thus, the quadrature modulator fails to be in the optimum bias conditions even when the same bias voltages as those applied in the previous normal operation state are applied to the quadrature modulator. Thus, it is necessary to obtain the optimum bias conditions that have changed due to changes in the temperature, and there is a problem that the state cannot transition from the transmission light blocking state to the normal operation state in a short time.

The present invention has been made in view of the above problems and it is an object of the present invention to provide an optical transmitter and a method for controlling the optical transmitter in which the output light intensity of transmission light is attenuated to less than a predetermined value in the transmission light blocking state, while the state can transition from the transmission light blocking state to the normal operation state in a short time.

Means for Solving the Problem

In order to achieve the above object, a first aspect of the present invention provides an optical transmitter. The optical transmitter of one embodiment includes: a light source configured to output carrier light; quadrature modulators configured to optically modulate the carrier light with a transmission electrical signal, the quadrature modulators including parent Mach-Zehnder modulators in respective paths of a first pair of paths into which the carrier light is split, the parent Mach-Zehnder modulators including child Mach-Zehnder modulators and second phase modulation units in respective paths of two second pairs of paths into which one of the first pair of paths is split, the parent Mach-Zehnder modulators being configured to combine outputs of the first pair of paths, the child Mach-Zehnder modulators including first phase modulation units and being configured to combine outputs of the two second pairs of paths; a light receiving element to which inverted output light of output light from each quadrature modulator is input; a transmission electric circuit configured to apply, to each quadrature modulator, the transmission electrical signal corresponding to an electrical signal input from outside; and a control circuit configured to apply a bias voltage to each quadrature modulator. Here, the transmission electric circuit is configured to, when blocking a transmission optical signal, adjust a voltage amplitude of the transmission electrical signal such that the voltage amplitude is smaller than a half-wave voltage or stop the transmission electrical signal, and the control circuit is configured to apply at most two dither signals to the first phase modulation units, detect a component output by the light receiving element, the component having n times a frequency of the dither signals, where n is an integer of one or more, and control the bias voltage to be applied to the first phase modulation units such that the component having n times the frequency is minimized.

A second aspect of the present invention provides a method for controlling the optical transmitter. The control method of one embodiment is a method for controlling an optical transmitter including a light source configured to output carrier light, quadrature modulators configured to optically modulate the carrier light with a transmission electrical signal, the quadrature modulators including parent Mach-Zehnder modulators in respective paths of a first pair of paths into which the carrier light is split, the parent Mach-Zehnder modulators including child Mach-Zehnder modulators and second phase modulation units in respective paths of two second pairs of paths into which one of the first pair of paths is split, the parent Mach-Zehnder modulators being configured to combine outputs of the first pair of paths, the child Mach-Zehnder modulators including first phase modulation units and being configured to combine outputs of the two second pairs of paths, a light receiving element to which inverted output light of output light from each quadrature modulator is input, a transmission electric circuit configured to apply, to each quadrature modulator, the transmission electrical signal corresponding to an electrical signal input from outside, and a control circuit configured to apply a bias voltage to each quadrature modulator, the method including: by the transmission electric circuit, adjusting, when blocking a transmission optical signal, a voltage amplitude of the transmission electrical signal such that the voltage amplitude is smaller than a half-wave voltage or stopping the transmission electrical signal; by the control circuit, applying at most two dither signals to the first phase modulation units; by the control circuit, detecting a component output by the light receiving element, the component having n times a frequency of the dither signals, where n is an integer of one or more; and by the control circuit, controlling the bias voltage to be applied to the first phase modulation units such that the component having n times the frequency is minimized.

Effects of the Invention

As described above, the present invention can provide an optical transmitter and a method for controlling the optical transmitter in which the output light intensity of transmission light is attenuated to less than a predetermined value in the transmission light blocking state, while the state can transition from the transmission light blocking state to the normal operation state in a short time.

DESCRIPTION OF EMBODIMENTS

Hereinafter, embodiments of the present invention will be described in detail with reference to the drawings. The same or similar reference signs indicate the same or similar elements, and repeated description is omitted.

Figure 1:
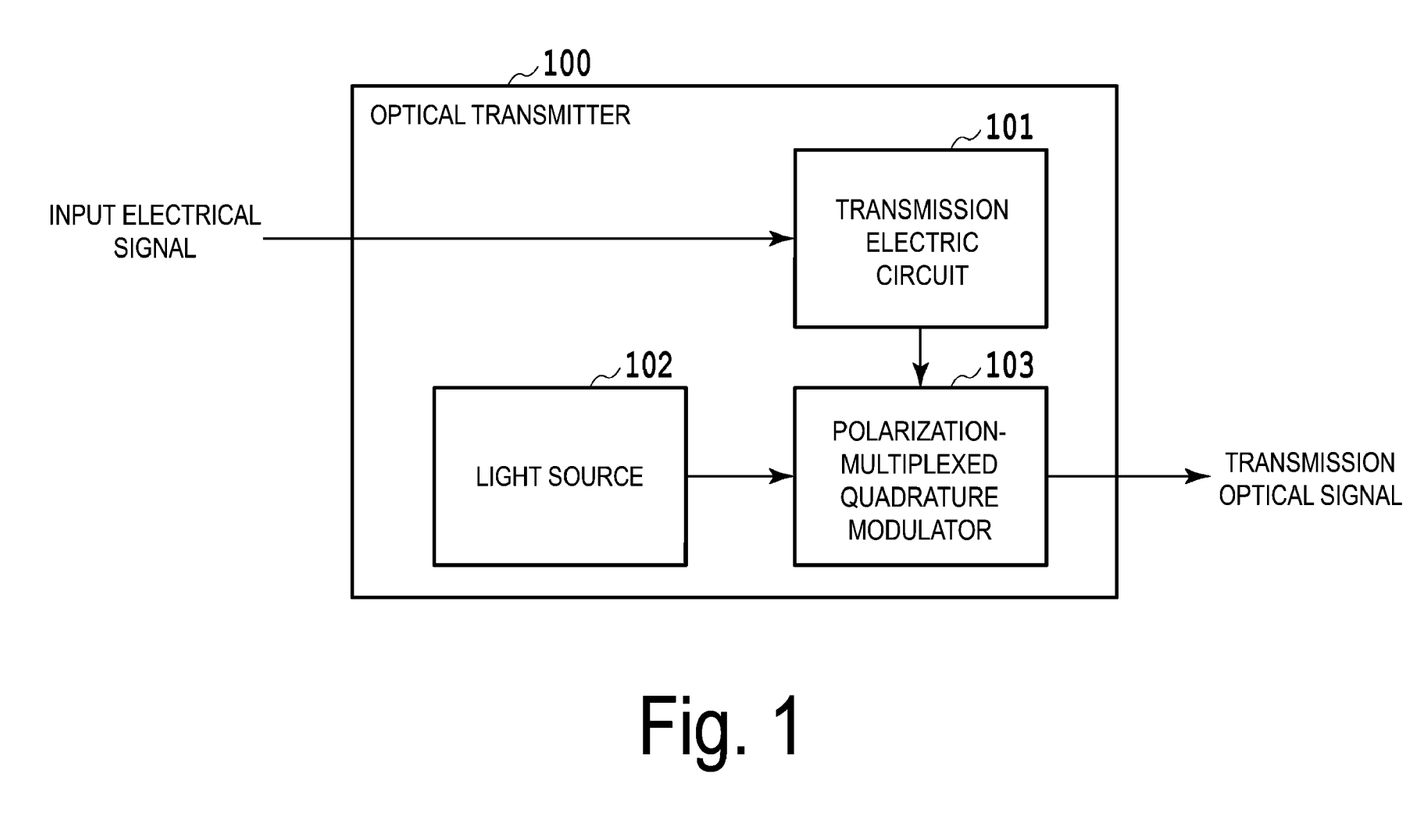
FIG. 1 is a basic configuration diagram of an optical transmitter according to an embodiment of the present invention.

FIG. 1 is a basic configuration diagram of an optical transmitter according to an embodiment of the present invention. The optical transmitter 100 includes a light source 102 that outputs carrier light, a transmission electric circuit 101 that converts an input electrical signal from the outside into a transmission electrical signal, and a polarization-multiplexed quadrature modulator 103 that converts the transmission electrical signal into an optical signal in which two orthogonal polarized waves are multiplexed and outputs the optical signal as a transmission optical signal. The optical transmitter 100 also includes a control circuit (not illustrated) that monitors and controls the exchange of control signals with an external host circuit and the operating states of optical electric circuits constituting the optical transmitter 100.

Figure 2:
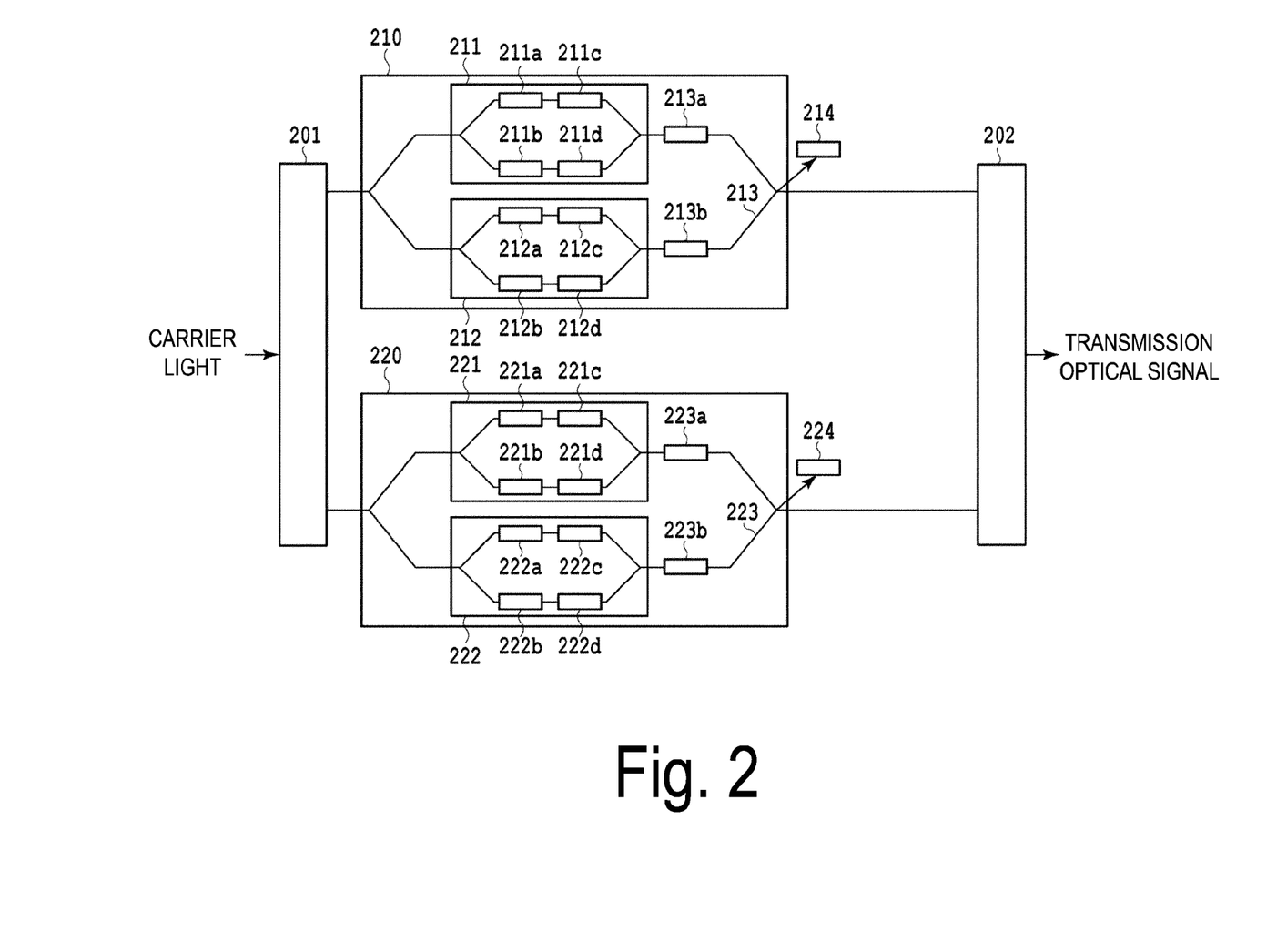
FIG. 2 is a diagram illustrating a first example configuration of a polarization-multiplexed quadrature modulator of the optical transmitter according to the embodiment of the present invention.

FIG. 2 is a detailed configuration diagram illustrating a first example of the polarization-multiplexed quadrature modulator 103 of FIG. 1. The polarization-multiplexed quadrature modulator includes an optical splitter 201 that splits the carrier light from the light source 102 into carrier light beams for respective polarizations, first and second quadrature modulators 210 and 220 that modulate the carrier light beams for the respective polarizations obtained through the splitting, light receiving elements 214 and 224 for detecting the light intensities of inverted output light beams of output light beams of the first and second quadrature modulators 210 and 220, respectively, and an optical combiner 202 that orthogonally combines the output light beams from the first and second quadrature modulators 210 and 220 and outputs the combined light beam as a polarization-multiplexed transmission optical signal. For example, each of the first and second quadrature modulators 210 and 220 is a Mach-Zehnder modulator that receives, as an input, a carrier light beam obtained through splitting of the optical splitter 201 and can be configured to split the carrier light beam into carrier light beams in two paths at a splitting portion on the input side and couple the carrier light beams guided through two paths together at a coupling portion on the output side. The splitting portion and the coupling portion can include a directional coupler, a multi-mode interference (MMI) circuit, or the like, and generally have a two-input, two-output configuration. The inputs of each quadrature modulator (the two inputs of the splitting portion of the Mach-Zehnder modulator) are referred to as ports 1 and 2, and the outputs (the two outputs of the coupling portion of the Mach-Zehnder modulator) are referred to as ports 3 and 4. When the port 1 is an input port of the quadrature modulator and the port 3 (a bar port) is an output port of the quadrature modulator, inverted light of carrier light output through the port 3 (light having a phase inverted by 180 degrees from the carrier light output through the port 3)) is output through the port 4 (a cross port). In this way, inverted output light beams of the output light beams of the quadrature modulators 210 and 220 can be input to the light receiving elements 214 and 224, respectively. Splitting off a part of the output light of the polarization-multiplexed quadrature modulator 103 to detect the intensity of the output light reduces the intensity of output light from the optical transmitter 100. Thus, in the present embodiment, the intensities of the inverted output light beams output from the coupling portions on the output sides of the quadrature modulators 210 and 220 are detected to prevent a reduction in the intensity of output light from the optical transmitter 100.

The quadrature modulators 210 and 220 of FIG. 2 each further split an input carrier light beam for the corresponding polarization into carrier light beams of two paths, and are configured such that Mach-Zehnder modulators (child modulators) 211 and 212 and 221 and 222, each of which causes a light beam passing through an upper path and a light beam passing through a lower path to interfere with each other according to the phase difference between the two light beams, and Mach-Zehnder modulators (parent modulators) 213 and 223, each of which includes corresponding child modulators in upper and lower paths, are nested in the respective quadrature modulators 210 and 220. A total of the six parent and child Mach-Zehnder modulators have, in their upper and lower paths, a total of eight phase modulation units 211a, 211b, 212a, 212b, 221a, 221b, 222a, and 222b, each of which changes the phase of light according to a transmission electrical signal from the transmission electric circuit 101, and a total of twelve phase modulation units 211c, 211d, 212c, 212d, 213a, 213b, 221c, 221d, 222c, 222d, 223a, and 223b, each of which changes the phase of light according to a bias voltage from the control circuit (not illustrated).

Each of the parent and child modulators causes a phase difference between a light beam passing through the upper path and a light beam passing through the lower path using the bias voltage output by the control circuit (not illustrated) and the voltage of the transmission electrical signal output by the transmission electric circuit 101 illustrated in FIG. 1. Each of the modulators causes the light beams to interfere with each other at the output portion according to the phase difference, whereby the carrier light is modulated with the transmission electrical signal and converted into modulated light of the corresponding polarization.

A bias control method, in which the control circuit automatically applies optimum bias voltages to the phase modulation units 211c, 211d, 212c, 212d, 213a, and 213b of the child modulators 211 and 212 and the parent modulator 213 of the first quadrature modulator 210 in a normal operation state, will be described. Although the automatic bias control method will be described below only for the child modulators 211 and 212 and the parent modulator 213 of the first quadrature modulator 210, the same applies to the phase modulation units 221c, 221d, 222c, 222d, 223a and 223b of the child modulators 221 and 222 and the parent modulator 223 of the second quadrature modulator 220.

First, a control method for applying optimum bias voltages to the phase modulation units 211c and 211d of the child modulator 211 will be described. The control circuit (not illustrated) superimposes a low-frequency differential dither signal on the bias voltages to be applied to the phase modulation units 211c and 211d of the child modulator 211. Here, the dither signal may be applied to only one of the phase modulation units 211c and 211d as a single-phase signal or may be applied to both the phase modulation units 211c and 211d as a push-pull signal. Thus, the output light of the child modulator 211 fluctuates according to the dither signal, and the control circuit detects a component having the same frequency as that of the dither signal, the component appearing in the light intensity detected by the first light receiving element 214. Then, the control circuit applies bias voltages to the phase modulation units 211c and 211d of the child modulator 211 while performing feedback control such that the detected component having the same frequency as that of the dither signal is minimized. When the component having the same frequency as that of the dither signal is minimized, the phase difference between light passing through the upper path and light passing through the lower path of the child modulator 211 caused by the phase modulation units 211c and 211d is 180 degrees (a null point) and the transmission electric circuit drives the phase modulation units 211a and 211b around the null point to generate modulated light. For example, when the transmission electrical signal is a binary non-return-to-zero (NRZ) signal, the output light of the child modulator 211 is binary-phase-shift-keying (BPSK)-modulated light. Such bias voltages at which the phase difference between light passing through the upper path and light passing through the lower path of the child modulator 211 caused by the phase modulation units 211c and 211d is 180 degrees correspond to an optimum bias condition of the child modulator in the normal operation state. A control method for applying optimum bias voltages to the phase modulation units 212c and 212d of the child modulator 212 is similar to that described above.

Next, a control method for applying optimum bias voltages to the phase modulation units 213a and 213b of the parent modulator 213 will be described. The control circuit (not illustrated) superimposes a low-frequency dither signal on the bias voltages to be applied to the phase modulation units 211c and 211d of the child modulator 211. Here, the dither signal may be applied to only one of the phase modulation units 211c and 211d as a single-phase signal or may be applied to both the phase modulation units 211c and 211d as a push-pull signal. At the same time, the control circuit superimposes a low-frequency dither signal on the bias voltages to be applied to the phase modulation units 212c and 212d of the child modulator 212. Here, the dither signal may be applied to only one of the phase modulation units 212c and 212d as a single-phase signal or may be applied to both the phase modulation units 212c and 212d as a push-pull signal. At this time, the relative phase between the two dither signals is set to 90 degrees. Thus, the output light of the parent modulator 213 fluctuates according to the dither signal, and the control circuit detects a component having twice the frequency of the dither signal, the component appearing in the light intensity detected by the light receiving element 214. Then, the control circuit applies bias voltages to the phase modulation units 213a and 213b of the parent modulator while performing feedback control such that the detected component having twice the frequency of the dither signal is minimized. When the component having twice the frequency of the dither signal is minimized, the phase difference between light passing through the upper path and light passing through the lower path of the parent modulator 213 is 90 degrees (a quad point) and the output light of the child modulator 211 is orthogonal to the output light of the child modulator 212. For example, when the transmission electrical signal is a binary NRZ signal, the output light of the child modulator 211 and the output light of the child modulator 212 are both BPSK-modulated light and the output light of the parent modulator 213 is quadrature-phase-shift-keying (QPSK)-modulated light in which the two BPSK-modulated light beams are orthogonal to each other. Such bias voltages at which the phase difference between light passing through the upper path and light passing through the lower path of the parent modulator 213 caused by the phase modulation units 213a and 213b is 90 degrees correspond to an optimum bias condition of the parent modulator in the normal operation state.

In the normal operation state, control of the child modulator 211, control of the child modulator 212, and control of the parent modulator 213 are sequentially performed along the time axis.

Next, a control method for attenuating the output light intensity of the optical transmitter 100 to less than a predetermined value in a transmission light blocking state will be described. Although the transmission light blocking control method will be described below only for the first quadrature modulator 210, the same applies to the second quadrature modulator 220.

Figure 3:
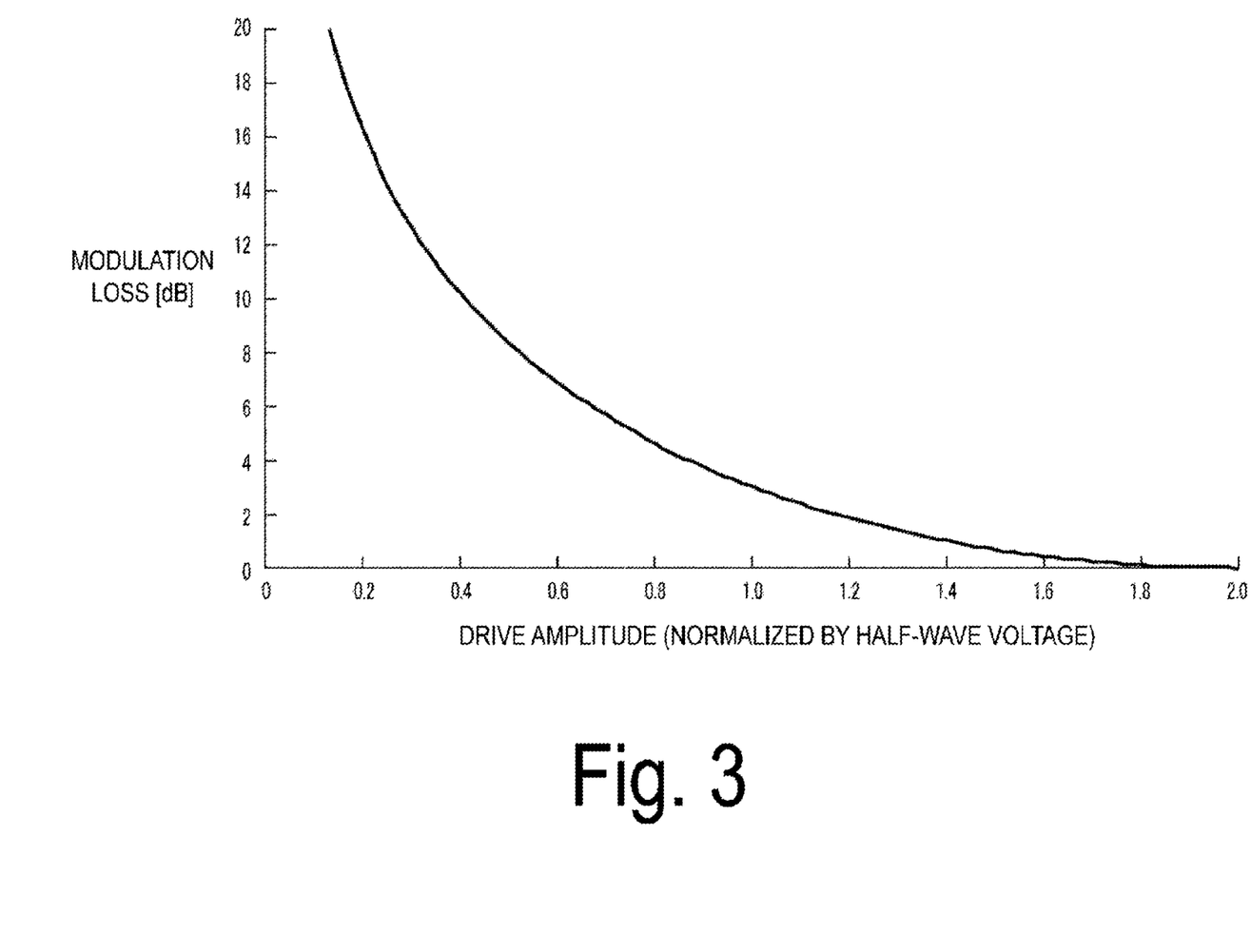
FIG. 3 is a diagram illustrating the dependence of the modulation loss of a child modulator upon the drive amplitude in BPSK modulation.

In the transmission light blocking state, the transmission electric circuit 101 sets its output amplitude to a sufficiently low value. In addition, the control circuit (not illustrated) superimposes a low-frequency differential dither signal on the bias voltages to be applied to the phase modulation units 211c and 211d of the child modulator 211 (in the same manner as in the normal operation state). Here, the dither signal may be applied to only one of the phase modulation units 211c and 211d as a single-phase signal or may be applied to both the phase modulation units 211c and 211d as a push-pull signal. Thus, the output light of the child modulator 211 fluctuates according to the dither signal, and the control circuit detects a component having the same frequency as that of the dither signal, the component appearing in the light intensity detected by the first light receiving element 214. Then, the control circuit applies bias voltages to the phase modulation units 211c and 211d of the child modulator 211 while performing feedback control such that the detected component having the same frequency as that of the dither signal is minimized. When the component having the same frequency as that of the dither signal is minimized, the phase difference between light passing through the upper path and light passing through the lower path of the child modulator 211 caused by the phase modulation units 211c and 211d is 180 degrees and the transmission electric circuit 101 drives the phase modulation units 211a and 211b around the null point with the low-amplitude transmission electrical signal to generate weak modulated light. The term "weak" is used here because the low output amplitude of the transmission electric circuit 101 causes the modulation loss of the child modulator 211 to increase and the light intensity of the modulated light to be attenuated. FIG. 3 is a diagram illustrating the dependence of the modulation loss of a child modulator upon the drive amplitude (normalized by a half-wave voltage) in BPSK modulation. As can be seen from FIG. 3, in a region where the drive amplitude is low, the child modulator increases sharply in modulation loss and thus can function as an optical attenuator. By detecting weak modulated light through the light receiving element 214 and performing feedback control (that is, by allowing the transmission electric circuit 101 to adjust the voltage amplitude of the transmission electrical signal such that the voltage amplitude is smaller than the half-wave voltage when the transmission optical signal is blocked), the bias condition of the child modulator 211 can be maintained at the null point even if the temperature changes in the transmission light blocking state. The same applies to the child modulator 212.

Further, the control circuit superimposes a low-frequency dither signal on the bias voltages to be applied to the phase modulation units 211c and 211d of the child modulator 211 (in the same manner as in the normal operation state). Here, the dither signal may be applied to only one of the phase modulation units 211c and 211d as a single-phase signal or may be applied to both the phase modulation units 211c and 211d as a push-pull signal. At the same time, the control circuit superimposes a low-frequency dither signal on the bias voltages to be applied to the phase modulation units 212c and 212d of the child modulator 212. Here, the dither signal may be applied to only one of the phase modulation units 212c and 212d as a single-phase signal or may be applied to both the phase modulation units 212c and 212d as a push-pull signal. At this time, the relative phase between the two dither signals is set to 90 degrees. Thus, the output light of the parent modulator 213 fluctuates according to the dither signal, and the control circuit detects a component having twice the frequency of the dither signal, the component appearing in the light intensity detected by the light receiving element 214. Then, the control circuit applies bias voltages to the phase modulation units 213a and 213b of the parent modulator 213 while performing feedback control such that the detected component having twice the frequency of the dither signal is minimized. When the component having twice the frequency of the dither signal is minimized, the phase difference between light passing through the upper path and light passing through the lower path of the parent modulator 213 is 90 degrees and weak output light of the child modulator 211 is orthogonal to weak output light of the child modulator 212. Then, by detecting weak output light of the parent modulator 213 through the light receiving element 214 and performing feedback control, the bias conditions of the parent modulator 213 can be maintained at the quad point even when the temperature changes in the transmission light blocking state.

In the transmission light blocking state, control of the child modulator 211, control of the child modulator 212, and control of the parent modulator 213 are sequentially performed along the time axis.

By causing the child modulators to function as optical attenuators in the transmission light blocking state in the above manner, the output intensity of the optical transmitter can be made less than a predetermined value and the transmission light blocking state can be achieved. Further, when the state transitions from the transmission light blocking state to the normal operation state, it is only required that the low output amplitude setting of the transmission electric circuit 101 return to a high amplitude setting of the normal operation state. Thus, the state can transition from the transmission light blocking state to the normal operation state in a short time.

Figure 4:
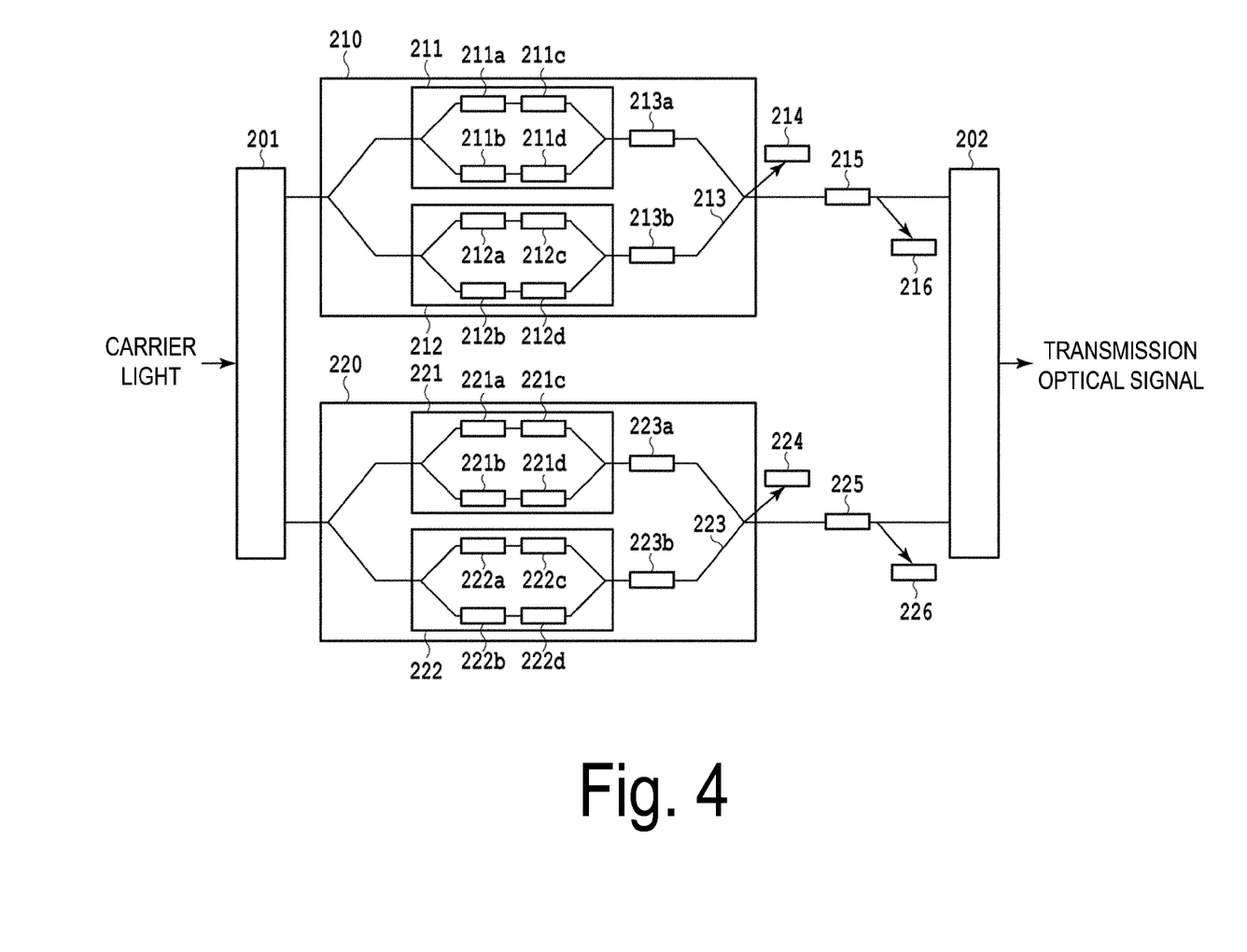
FIG. 4 is a diagram illustrating a second example configuration of the polarization-multiplexed quadrature modulator of the optical transmitter according to the embodiment of the present invention.

FIG. 4 is a detailed configuration diagram illustrating a second example of the polarization-multiplexed quadrature modulator 103 of FIG. 1. The polarization-multiplexed quadrature modulator includes an optical splitter 201 that splits carrier light from the light source 102 into carrier light beams for respective polarizations, first and second quadrature modulators 210 and 220 that modulate the carrier light beams for the respective polarizations obtained through the splitting, light receiving elements 214 and 224 for detecting the light intensities of inverted output light beams of output light beams of the first and second quadrature modulators 210 and 220, respectively, optical attenuators 215 and 225 that adjust the intensities of output light beams from the first and second quadrature modulators 210 and 220, respectively, light receiving elements 216 and 226 for detecting the light intensities of inverted output light beams of output light beams of the optical attenuators 215 and 225, and an optical combiner 202 that orthogonally combines the output light beams from the first and second quadrature modulators 210 and 220 and outputs the combined light beam as a polarization-multiplexed transmission optical signal. The addition of the optical attenuators 215 and 225 and the light receiving elements 216 and 226 is the difference from the configuration of the first example of the polarization-multiplexed quadrature modulator 103 described with reference to FIG. 2.

The optical attenuators 215 and 216 are configured of Mach-Zehnder modulators similar to the child modulators 211, 212, 221 and 222, and the control circuit (not illustrated) causes these child modulators to function as optical attenuators as described above in the first example of the polarization-multiplexed quadrature modulator 103.

The normal operation state and the transmission light blocking state of the polarization-multiplexed quadrature modulator 103 of the second example will be described. Although the following description is made to the paths of the first quadrature modulator 210, the same applies to the paths of the second quadrature modulator 220.

In the normal operation state, the control circuit (not illustrated) applies optimum bias voltages to the quadrature modulator 210 through the same control method as in the first example. Further, the control circuit detects the light intensity of the inverted output of the optical attenuator 215 through the light receiving element 216. When the light intensity of the inverted output of the optical attenuator 215 is minimized, the light intensity of the output of the optical attenuator 215 is maximized and thus the control circuit applies, to the optical attenuator 215, a voltage which minimizes the light intensity detected by the light receiving element 216.

In the transmission light blocking state, the transmission electric circuit 101 sets its output amplitude to a sufficiently low value. In addition, the control circuit (not illustrated) maintains the bias conditions of the child modulators 211, 212, 221 and 222 at the null point and the bias conditions of the parent modulators 213 and 223 at the quad point through the same control method as in the first example. Further, the control circuit detects the light intensity of the inverted output of the optical attenuator 215 through the light receiving element 216. When the light intensity of the inverted output of the optical attenuator 215 is maximized, the light intensity of the output of the optical attenuator 215 is minimized and thus the control circuit applies, to the optical attenuator 215, a voltage which maximizes the light intensity detected by the light receiving element 216.

The control circuit may detect a component having twice the frequency of the dither signal through the light receiving element 216, instead of detecting the component having twice the frequency of the dither signal through the light receiving element 214, in order to maintain the bias conditions of the child modulators 211, 212, 221 and 222 at the null point and the bias conditions of the parent modulators 213 and 223 at the quad point in the transmission light blocking state described above.

By causing the child modulators to function as optical attenuators in the transmission light blocking state and further causing the optical attenuator 215 to attenuate weak output light from the parent modulator 210, the output intensity of the optical transmitter 100 can be made less than a predetermined value and the transmission light blocking state can be achieved. Further, when the state transitions from the transmission light blocking state to the normal operation state, it is only required that the low output amplitude setting of the transmission electric circuit 101 return to a high amplitude setting of the normal operation state and that the control circuit apply, to the optical attenuator 215, a voltage which minimizes the light intensity detected by the light receiving element 216. Thus, the state can transition from the transmission light blocking state to the normal operation state in a short time.

Figure 5:
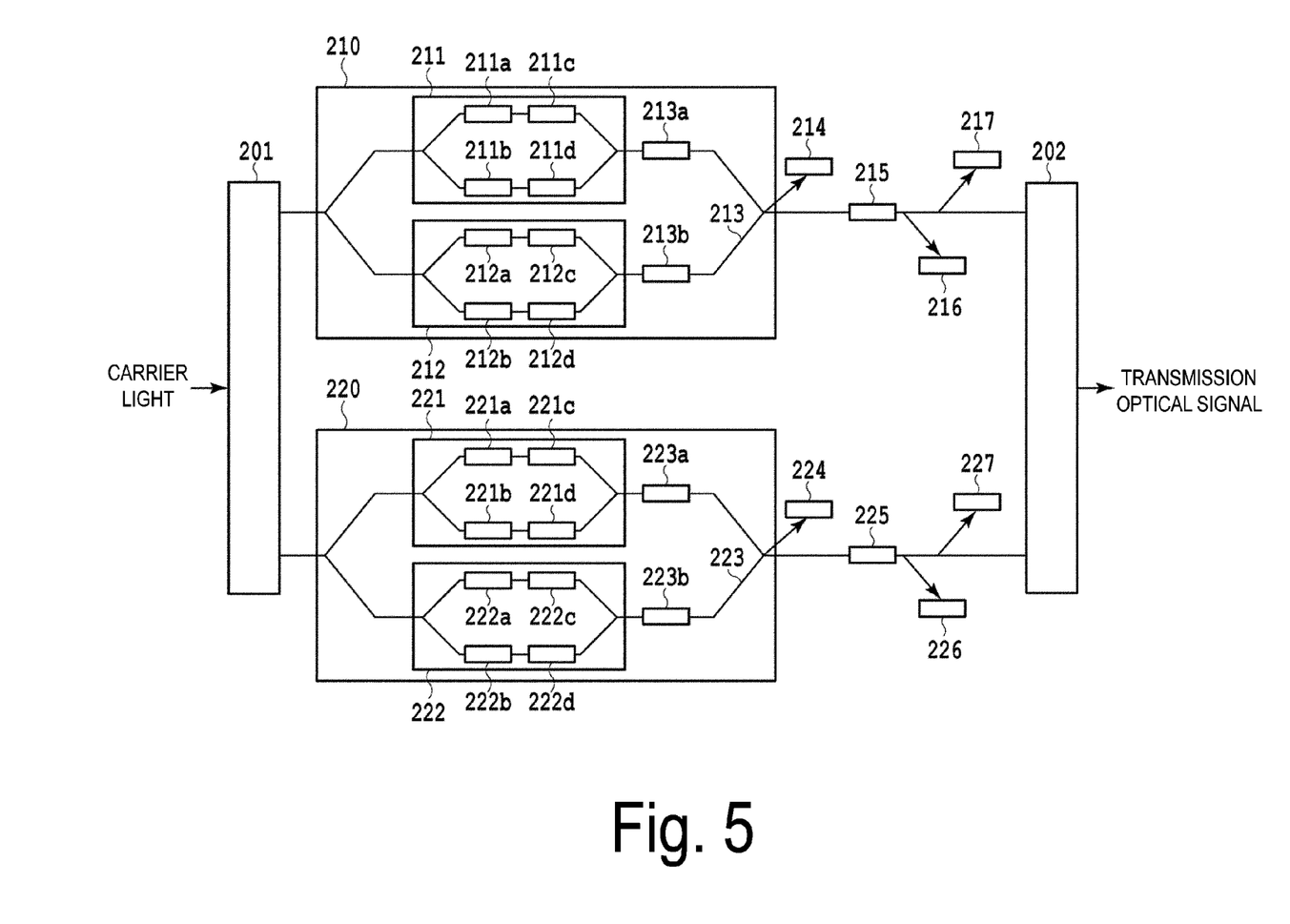
FIG. 5 is a diagram illustrating a third example configuration of the polarization-multiplexed quadrature modulator of the optical transmitter according to the embodiment of the present invention.

FIG. 5 is a detailed configuration diagram illustrating a third example of the polarization-multiplexed quadrature modulator 103 of FIG. 1. The polarization-multiplexed quadrature modulator includes an optical splitter 201 that splits carrier light from the light source 102 into carrier light beams for respective polarizations, first and second quadrature modulators 210 and 220 that modulate the carrier light beams for the respective polarizations obtained through the splitting, light receiving elements 214 and 224 for detecting the light intensities of inverted output light beams of output light beams of the first and second quadrature modulators 210 and 220, respectively, optical attenuators 215 and 225 that adjust the intensities of output light beams from the first and second quadrature modulators 210 and 220, respectively, light receiving elements 216 and 226 for detecting the light intensities of inverted output light beams of output light beams of the optical attenuators 215 and 225, light receiving elements 217 and 227 for detecting the light intensities of output light beams obtained by splitting several percent of the output light beams of the optical attenuators 215 and 225, and an optical combiner 202 that orthogonally combines the output light beams from the first and second quadrature modulators and outputs the combined light beam as a polarization-multiplexed transmission optical signal. The addition of the light receiving elements 217 and 227 is the difference from the configuration of the second example of the polarization-multiplexed quadrature modulator 103 described with reference to FIG. 4.

The normal operation state and the transmission light blocking state of the polarization-multiplexed quadrature modulator 103 of the third example will be described. Although the following description is made to the paths of the first quadrature modulator 210, the same applies to the paths of the second quadrature modulator 220.

In the normal operation state, the control circuit (not illustrated) applies optimum bias voltages to the quadrature modulator 210 through the same control method as in the first example. The control circuit may detect a component having twice the frequency of the dither signal through the light receiving element 217, instead of detecting the component having twice the frequency of the dither signal through the light receiving element 214, in order to apply optimum bias voltages to the quadrature modulator 210. Further, the control circuit detects, through the light receiving element 217, the light intensity of output light obtained by splitting several percent of the output light of the optical attenuator 215 and applies, to the optical attenuator 215, a voltage which brings the output light intensity of the optical transmitter 100 to a desired value.

In the transmission light blocking state, the transmission electric circuit 101 sets its output amplitude to a sufficiently low value. In addition, the control circuit maintains the bias conditions of the child modulators 211, 212, 221 and 222 at the null point and the bias conditions of the parent modulators 213 and 223 at the quad point through the same control method as in the first example. Further, the control circuit detects the light intensity of the inverted output of the optical attenuator 215 through the light receiving element 216. When the light intensity of the inverted output of the optical attenuator 215 is maximized, the light intensity of the output of the optical attenuator 215 is minimized and thus the control circuit applies, to the optical attenuator 215, a voltage which maximizes the light intensity detected by the light receiving element 216.

The control circuit may detect a component having twice the frequency of the dither signal through the light receiving element 216 in order to maintain the bias conditions of the child modulators 211, 212, 221 and 222 at the null point and the bias conditions of the parent modulators 213 and 223 at the quad point in the transmission light blocking state described above. This is performed instead of allowing the control circuit to detect a component having twice the frequency of the dither signal through the light receiving element 214. In this case, the light receiving element 214 is neither used in the normal operation state nor in the light transmission light blocking state and thus may be removed (or may not be provided).

By causing the child modulators to function as optical attenuators in the transmission light blocking state and further causing the optical attenuator to attenuate weak output light from the parent modulator, the output intensity of the optical transmitter can be made less than a predetermined value and the transmission light blocking state can be achieved. Further, when the state transitions from the transmission light blocking state to the normal operation state, it is only required that the low output amplitude setting of the transmission electric circuit return to a high amplitude setting of the normal operation state and that the control circuit apply, to the optical attenuator 215, a voltage which brings the light intensity detected by the light receiving element 217 to a desired value. Thus, the state can transition from the transmission light blocking state to the normal operation state in a short time.

Although the transmission electric circuit 101 sets its output amplitude to a sufficiently low value in the transmission light blocking state of the first, second, and third examples of the polarization-multiplexed quadrature modulator 103 described so far, the transmission electric circuit 101 may set the output amplitude to zero to stop the transmission electrical signal. Because the actual splitting ratio between light beams into the upper and lower paths of each child modulator is not exactly in a ratio of 50:50 even if the transmission electrical signal is stopped, light cannot be completely extinguished even when the phase difference between light passing through the upper path and light passing through the lower path is 180 degrees. By detecting such light that cannot be completely extinguished through the light receiving element, the bias conditions of the child modulators can be maintained at the null point and the bias conditions of the parent modulators can be maintained at the quad point through the same control method as in the first example.

In the transmission light blocking state of the first, second, and third examples of the polarization-multiplexed quadrature modulator 103 described so far, the control circuit superimposes a low-frequency dither signal on the bias voltages to be applied to the phase modulation units of each child modulator and detects a component having the same frequency as that of the dither signal, the component appearing in the light intensity detected by the light receiving element, in order to maintain the bias condition of the child modulator at the null point. In an alternative method, the control circuit may apply bias voltages to the phase modulation units of each child modulator such that the light intensity detected by the light receiving element is minimized without superimposing a dither signal. If the output amplitude of the transmission electric circuit is sufficiently low, the light intensity is minimized when the bias condition of each child modulator is at the null point. Therefore, the bias condition of each child modulator can be maintained at the null point by minimizing the light intensity detected by the light receiving element 214, 216, or 217.

REFERENCE SIGNS LIST

100 Optical transmitter
101 Transmission electric circuit
102 Light source
103 Polarization-multiplexed quadrature modulator
201 Optical splitter
202 Optical combiner
210, 220 Quadrature modulator
214, 216, 217, 224, 226, 227 Light receiving element
211, 212, 221, 222 Mach-Zehnder modulator (child modulator)
213, 223 Mach-Zehnder modulator (parent modulator)
211a, 211b, 212a, 212b, 221a, 221b, 222a, 222b Phase modulation unit
211c, 211d, 212c, 212d, 213a, 213b, 221c, 221d, 222c, 222d, 223a, 223b Phase modulation unit
215, 225 Optical attenuator

The invention claimed is:
1. An optical transmitter comprising:
a light source that outputs carrier light;
quadrature modulators that optically modulate the carrier light with a transmission electrical signal, the quadrature modulators including parent Mach-Zehnder modulators in respective paths of a first pair of paths into which the carrier light is split, the parent Mach-Zehnder modulators including child Mach-Zehnder modulators and second phase modulation units in respective paths of two second pairs of paths into which one of the first pair of paths is split, the parent Mach-Zehnder modulators combining outputs of the first pair of paths, the child Mach-Zehnder modulators including first phase modulation units and combining outputs of the two second pairs of paths;
a first light receiver to which inverted output light of output light from each quadrature modulator is input;
a second light receiver to which inverted output light of output light from each quadrature modulator is input;
a third light receiver to which inverted output light of output light from each quadrature modulator is input, wherein the inverted output light that is inputted into the third light receiver is a portion of the inverted output light that is inputted into the second receiver, wherein the output light that is inputted to the first, second, and third light receivers is output from the same quadrature modulator;
a transmission electric circuit that applies, to each quadrature modulator, the transmission electrical signal corresponding to an electrical signal input from outside; and
a control circuit that applies a bias voltage to each quadrature modulator,
wherein the transmission electric circuit, when blocking a transmission optical signal, adjusts a voltage amplitude of the transmission electrical signal such that the volt- age amplitude is smaller than a half-wave voltage or stop the transmission electrical signal, and the control circuit applies at most two dither signals to the first phase modulation units, detects a component output by the first or second light receiver, the component having n times a frequency of the dither signals, where n is an integer of one or more, and control the bias voltage to be applied to the first phase modulation units such that the component having n times the frequency is minimized.

2. The optical transmitter according to claim 1, wherein, when the number of the dither signals is two and the two dither signals are applied to the respective first phase modulation units, a relative phase difference between the two dither signals is 90 degrees.

3. An optical transmitter comprising:

a light source that outputs carrier light;

quadrature modulators that optically modulate the carrier light with a transmission electrical signal, the quadrature modulators including parent Mach-Zehnder modulators in respective paths of a first pair of paths into which the carrier light is split, the parent Mach-Zehnder modulators including child Mach-Zehnder modulators and second phase modulation units in respective paths of two second pairs of paths into which one of the first pair of paths is split, the parent Mach-Zehnder modulators combining outputs of the first pair of paths, the child Mach-Zehnder modulators including first phase modulation units combining outputs of the two second pairs of paths;

a first light receiver to which inverted output light of output light from each quadrature modulator is input;

an optical attenuator that adjusts an intensity of the output light from each quadrature modulator;

a second light receiver to which inverted output light of output light from each quadrature modulator is input, a third light receiver to which inverted output light of output light from each quadrature modulator is input, wherein the inverted output light that is inputted into the third light receiver is a portion of the inverted output light that is inputted into the second light receiver, wherein the output light that is inputted to the first, second, and third light receivers is output from the same quadrature modulator;

a transmission electric circuit that applies, to each quadrature modulator, the transmission electrical signal corresponding to an electrical signal input from outside; and a control circuit that applies a bias voltage to each quadrature modulator, wherein the transmission electric circuit, when blocking a transmission optical signal, adjusts a voltage amplitude of the transmission electrical signal such that the voltage amplitude is smaller than a half-wave voltage or stop the transmission electrical signal, the control circuit detects an electrical signal output by the second light r receiver, the electrical signal changing according to an inverted output of the optical attenuator, and control the optical attenuator such that the electrical signal is maximized, and the control circuit applies at most two dither signals to the first phase modulation units, detects a component output by the first or second light receivers, the component having n times a frequency of the dither signals, where n is an integer of one or more, and control the bias voltage to be applied to the first phase modulation units such that the component having n times the frequency is minimized.

4. The optical transmitter according to claim 3, wherein, when the number of the dither signals is two and the two dither signals are applied to the respective first phase modulation units, a relative phase difference between the two dither signals is 90 degrees.

5. A method for controlling an optical transmitter including a light source that outputs carrier light, quadrature modulators configured to optically modulate the carrier light with a transmission electrical signal, the quadrature modulators including parent Mach-Zehnder modulators in respective paths of a first pair of paths into which the carrier light is split, the parent Mach-Zehnder modulators including child Mach-Zehnder modulators and second phase modulation units in respective paths of two second pairs of paths into which one of the first pair of paths is split, the parent Mach-Zehnder modulators combining outputs of the first pair of paths, the child Mach-Zehnder modulators including first phase modulation units and being configured to combine outputs of the two second pairs of paths, a first light receiver to which inverted output light of output light from each quadrature modulator is input, a second light receiver to which inverted output light of output light from each quadrature modulator is input, a third light receiver to which inverted output light of output light from each quadrature modulator is input, wherein the inverted output light that is inputted into the third light receiver is a portion of the inverted output light that is inputted into the second light receiver, wherein the output light that is inputted to the first, second, and third light receivers is output from the same quadrature modulator, a transmission electric circuit that applies, to each quadrature modulator, the transmission electrical signal corresponding to an electrical signal input from outside, and a control circuit that applies a bias voltage to each quadrature modulator, the method comprising:

by the transmission electric circuit, adjusting, when blocking a transmission optical signal, a voltage amplitude of the transmission electrical signal such that the voltage amplitude is smaller than a half-wave voltage or stopping the transmission electrical signal;

by the control circuit, applying at most two dither signals to the first phase modulation units;

by the control circuit, detecting a component output by the light receiver, the component having n times a frequency of the dither signals, where n is an integer of one or more; and by the control circuit, controlling the bias voltage to be applied to the first phase modulation units such that the component having n times the frequency is minimized.

6. The method according to claim 5, wherein, when the number of the dither signals is two and the two dither signals are applied to the respective first phase modulation units, a relative phase difference between the two dither signals is 90 degrees.

* * * * *